United States Patent
Hong

(10) Patent No.: US 11,184,941 B2
(45) Date of Patent: *Nov. 23, 2021

(54) METHOD AND APPARATUS FOR PROTECTING USER EQUIPMENT, USER EQUIPMENT AND BASE STATION

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 54 days.

This patent is subject to a terminal disclaimer.

(21) Appl. No.: 16/614,338

(22) PCT Filed: May 18, 2017

(86) PCT No.: PCT/CN2017/084943
§ 371 (c)(1),
(2) Date: Nov. 15, 2019

(87) PCT Pub. No.: WO2018/209656
PCT Pub. Date: Nov. 22, 2018

(65) Prior Publication Data
US 2020/0154502 A1    May 14, 2020

(51) Int. Cl.
*H04W 76/20* (2018.01)
*H04B 17/24* (2015.01)
*H04W 76/25* (2018.01)

(52) U.S. Cl.
CPC ................... *H04W 76/25* (2018.02)

(58) Field of Classification Search
CPC ..... H04W 76/25; H04W 76/20; H04W 24/04; H04W 52/08; H04W 52/0235; H04W 52/0251; H04B 17/18; H04B 17/24
See application file for complete search history.

(56) References Cited

U.S. PATENT DOCUMENTS 6,760,311 B1    7/2004 Raith
7,860,018 B2    12/2010 Raith
(Continued)

FOREIGN PATENT DOCUMENTS

CN    1411638 A    4/2003
CN    102119490 A    7/2011
(Continued)

OTHER PUBLICATIONS

International Search Report issued to PCT Application No. PCT/CN2017/084943, dated Jan. 31, 2018, (4p).
(Continued)

*Primary Examiner* — Andrew Wendell
(74) *Attorney, Agent, or Firm* — Arch & Lake LLP

(57) ABSTRACT

A method and an apparatus for protecting UE, UE, and a base station are provided by the present disclosure. The method of protecting UE includes: a first request message for adjusting a radio link configuration is received from UE; when determining that the radio link configuration is to be adjusted based on the first request message, a first response message is generated and sent, where the first response message carries first configuration information to which the UE is to be adjusted; after sending the first response message, it is monitored within a first preset time period whether there is a second request message for adjusting the radio link configuration sent by the UE; and the radio link configuration of the UE is re-adjusted based on a monitoring result within the first preset time period. The technical solution of the present disclosure may lower the device temperature of the UE by reducing the radio link configuration without traffic data transmission interruption, and the base station may re-adjust the UE to a higher radio link configuration when the UE is no longer overheated, so as to meet a user's requirement for high-speed data transmission.

16 Claims, 9 Drawing Sheets

(56) References Cited

U.S. PATENT DOCUMENTS

| | | | |
|---|---|---|---|
| 2004/0160901 A1 | 8/2004 | Raith | |
| 2009/0017762 A1* | 1/2009 | Jovicic | H04W 72/082 |
| | | | 455/63.1 |
| 2014/0269541 A1* | 9/2014 | Khude | H04W 72/042 |
| | | | 370/329 |
| 2015/0304011 A1* | 10/2015 | Ponnuswamy | H04B 7/0617 |
| | | | 370/329 |
| 2017/0064632 A1 | 3/2017 | Ohshima et al. | |
| 2018/0014259 A1* | 1/2018 | Yang | H04L 1/18 |
| 2018/0294924 A1* | 10/2018 | Jeon | H04L 5/14 |
| 2020/0145877 A1* | 5/2020 | Hong | H04W 88/023 |

FOREIGN PATENT DOCUMENTS

| | | |
|---|---|---|
| CN | 102548012 A | 7/2012 |
| CN | 105813122 A | 7/2016 |
| CN | 109104899 A | 12/2018 |

OTHER PUBLICATIONS

State Intellectual Property Office of the People's Republic of China, Office Action and Search Report Issued in Application No. 201780000353.3, dated Apr. 26, 2021, with English translation, (18p).

\* cited by examiner

METHOD AND APPARATUS FOR PROTECTING USER EQUIPMENT, USER EQUIPMENT AND BASE STATION

CROSS REFERENCE TO RELATED APPLICATION

[00011] The present application is the U.S. national phase of PCT Application No. PCT/CN2017/084943 filed on May 18, 2017, which is incorporated herein by reference in its entirety for all purpose.

TECHNICAL FIELD

The present disclosure relates to wireless communication technology and, in particular, to a method and an apparatus for protecting user equipment, user equipment, and a base station.

BACKGROUND

In a Long Term Evolution (LTE) system, wireless transmission means, such as high-order Multiple-Input Multiple-Output (MIMO), multi-carrier aggregation, or high-order modulation decoding, can be provided for User Equipment (UE), to meet a user's requirement for high-speed data transmission. However, such high-speed wireless transmission means may cause the UE to get overheated, and UE getting overheated may further cause problems such as transmission interruption for traffic data of the UE or even restart of the UE.

In the related art, in order to ensure a good experience when a user uses UE, UE providers generally perform temperature control on mobile phones. For example, the UE can be controlled to reduce the radio link configuration by means of detaching and reattaching to avoid UE getting overheated. In the related art, the UE may cause traffic data transmission interruption during the process of detaching and reattaching, which can reduce the user experience.

SUMMARY

In order to overcome the problems in the related art, the examples of the present disclosure provide a method and an apparatus for protecting UE, UE, and a base station, so as to lower a device temperature of the UE by reducing a radio link configuration without traffic data transmission interruption when the UE is overheated, and the base station can re-adjust the radio link configuration of the UE to a higher configuration when the UE is no longer overheated, so as to meet a user's requirement for high-speed data transmission.

According to a first aspect of the examples of the present disclosure, a method of protecting UE is provided, including:

receiving a first request message for adjusting a radio link configuration sent by UE;

when determining that the radio link configuration is to be adjusted based on the first request message, generating and sending a first response message, wherein the first response message carries first configuration information to which the UE is to be adjusted;

after sending the first response message, monitoring within a first preset time period whether there is a second request message for adjusting the radio link configuration sent by the UE; and re-adjusting the radio link configuration of the UE based on a monitoring result within the first preset time period.

In an example, re-adjusting the radio link configuration of the UE based on the monitoring result within the first preset time period includes:

when the monitoring result indicates that the second request message is not detected within the first preset time period, sending a first reconfiguration message to the UE, wherein the first reconfiguration message carries second configuration information indicating a radio link configuration higher than that indicated by the first configuration information.

In an example, the method further includes:

when determining that the radio link configuration is not to be adjusted based on the first request message, generating and sending a second response message, wherein the second response message carries indication information of refusal to adjust the radio link configuration; or when determining that the radio link configuration is not to be adjusted based on the first request message, refusing to send the UE a response message corresponding to the request message.

In an example, the second response message carries a base-station indication time and/or a maximum number of transmission times, the base-station indication time representing a time for the UE to send the request message again, indicated by a base station, and the maximum number of transmission times representing a maximum number of times for which the UE sends the request message, indicated by the base station.

In an example, the method further includes:

sending the base-station indication time and/or the maximum number of transmission times to the UE when the UE successfully establishes a radio resource control connection.

According to a second aspect of the examples of the present disclosure, a method of protecting UE is provided, including:

after sending a first request message for adjusting a radio link configuration to a base station, monitoring a response message corresponding to the first request message within a second preset time period; and performing a corresponding operation for lowering a device temperature based on a monitoring result within the second preset time period.

In an example, performing the corresponding operation for lowering the device temperature based on the monitoring result within the second preset time period includes:

when the monitoring result indicates that the response message is not detected within the second preset time period, detecting the device temperature of the UE at an end time of the second preset time period; and when the device temperature of the UE at the end time of the second preset time period is higher than a preset temperature threshold, sending a second request message for adjusting the radio link configuration at the end time of the second preset time period.

In an example, performing the corresponding operation for lowering the device temperature based on the monitoring result within the second preset time period includes:

when the monitoring result indicates that the response message is detected within the second preset time period and the response message indicates refusal to reduce the radio link configuration, determining a maximum number of transmission times for a second request message; and when the device temperature of the UE keeps higher than a preset temperature threshold, sending the second request message to the base station, at most the maximum number of transmission times, at a system-appointed time interval.

In an example, the method further includes:

when a number of times for which the second request message has been sent reaches the maximum number of transmission times, while no response message for reducing the radio link configuration sent by the base station is detected yet and the device temperature of the UE is still higher than the preset temperature threshold, performing a preset operation for lowering the device temperature.

In an example, the method further includes:

when the monitoring result indicates that the response message is detected within the second preset time period and the response message indicates refusal to reduce the radio link configuration, determining a base-station indication time to send the second request message;

detecting the device temperature of the UE at the base-station indication time; and when the device temperature of the UE at the base-station indication time is higher than the preset temperature threshold, sending the second request message for adjusting the radio link configuration at the base-station indication time.

In an example, performing the corresponding operation for lowering the device temperature based on the monitoring result within the second preset time period includes:

when the monitoring result indicates that the response message is detected within the second preset time period and the response message indicates reducing the radio link configuration, detecting the device temperature of the UE within a third preset time period, wherein a start time of the third preset time period is a time when the response message is received; and when the device temperature of the UE within the third preset time period indicates that the UE is still overheated, sending a second request message for adjusting the radio link configuration at an end time of the third preset time period.

According to a third aspect of the examples of the present disclosure, an apparatus for protecting UE is provided, including:

a receiving module configured to receive a first request message for adjusting a radio link configuration sent by UE;

a first response module configured to, when it is determined that the radio link configuration is to be adjusted based on the first request message received by the receiving module, generate and send a first response message, wherein the first response message carries first configuration information to which the UE is to be adjusted;

a first monitoring module configured to, after the first response module sends the first response message, monitor within a first preset time period whether there is a second request message for adjusting the radio link configuration sent by the UE; and a reconfiguration module configured to re-adjust the radio link configuration of the UE based on a monitoring result within the first preset time period from the first monitoring module.

In an example, the reconfiguration module includes:

a first sending sub-module configured to, when the monitoring result indicates that the second request message is not detected within the first preset time period, send a first reconfiguration message to the UE, wherein the first reconfiguration message carries second configuration information indicating a radio link configuration higher than that indicated by the first configuration information.

In an example, the apparatus further includes:

a second response module configured to, when it is determined that the radio link configuration is not to be adjusted based on the first request message, generate and send a second response message, wherein the second response message carries indication information of refusal to adjust the radio link configuration; or a refusal-to-response module configured to, when determining that the radio link configuration is not to be adjusted based on the first request message, refuse to send the UE a response message corresponding to the request message.

In an example, the second response message carries a base-station indication time and/or a maximum number of transmission times, the base-station indication time representing a time for the UE to send the request message again, indicated by a base station, and the maximum number of transmission times representing a maximum number of times for which the UE sends the request message, indicated by the base station.

In an example, the apparatus further includes:

a first sending module configured to send the base-station indication time and/or the maximum number of transmission times to the UE when the UE successfully establishes a radio resource control connection.

According to a fourth aspect of the examples of the present disclosure, an apparatus for protecting UE is provided, including:

a second monitoring module configured to, after a first request message for adjusting a radio link configuration is sent to a base station, monitor a response message corresponding to the first request message within a second preset time period; and a first execution module configured to perform a corresponding operation for lowering a device temperature based on a monitoring result within the second preset time period.

In an example, the first execution module includes:

a first detecting sub-module configured to, when the monitoring result indicates that the response message is not detected within the second preset time period, detect the device temperature of the UE at an end time of the second preset time period; and a second sending sub-module configured to, when the device temperature of the UE at the end time of the second preset time period, detected by the first detecting sub-module, is higher than a preset temperature threshold, send a second request message for adjusting the radio link configuration at the end time of the second preset time period.

In an example, the first execution module includes:

a determining sub-module configured to, when the monitoring result indicates that the response message is detected within the second preset time period and the response message indicates refusal to reduce the radio link configuration, determine a maximum number of transmission times for a second request message; and a third sending sub-module configured to, when the device temperature of the UE keeps higher than a preset temperature threshold, send the second request message to the base station, at most the maximum number of transmission times, at a system-appointed time interval.

In an example, the apparatus further includes:

a second execution module configured to, when a number of times for which the second request message has been sent reaches the maximum number of transmission times, while no response message for reducing the radio link configuration sent by the base station is detected yet and the device temperature of the UE is still higher than the preset temperature threshold, perform a preset operation for lowering the device temperature.

In an example, the apparatus further includes:

a determining module configured to, when the monitoring result indicates that the response message is detected within the second preset time period and the response message indicates refusal to reduce the radio link configuration, determine a base-station indication time to send the second request message;

a detecting module configured to detect the device temperature of the UE at the base-station indication time; and a second sending module configured to, when the device temperature of the UE at the base-station indication time is higher than the preset temperature threshold, send the second request message for adjusting the radio link configuration at the base-station indication time.

In an example, the first execution module includes:

a second detecting sub-module configured to, when the monitoring result indicates that the response message is detected within the second preset time period and the response message indicates reducing the radio link configuration, detect the device temperature of the UE within a third preset time period, wherein a start time of the third preset time period is a time when the response message is received; and a fourth sending sub-module configured to, when the device temperature of the UE within the third preset time period indicates that the UE is still overheated, send a second request message for adjusting the radio link configuration at an end time of the third preset time period.

According to a fifth aspect of the examples of the present disclosure, a base station is provided, including:

a processor; and a memory storing instructions executable by the processor;

wherein the processor is configured to:

receive a first request message for adjusting a radio link configuration sent by UE;

when determining that the radio link configuration is to be adjusted based on the first request message, generate and send a first response message, wherein the first response message carries first configuration information to which the UE is to be adjusted;

after sending the first response message, monitor within a first preset time period whether there is a second request message for adjusting the radio link configuration sent by the UE; and re-adjust the radio link configuration of the UE based on a monitoring result within the first preset time period.

According to a sixth aspect of the examples of the present disclosure, user equipment is provided, including:

a processor; and a memory storing instructions executable by the processor;

wherein the processor is configured to:

after sending a first request message for adjusting a radio link configuration to a base station, monitor a response message corresponding to the first request message within a second preset time period; and perform a corresponding operation for lowering a device temperature based on a monitoring result within the second preset time period.

According to a seventh aspect of the examples of the present disclosure, there is provided a non-transitory computer-readable storage medium storing computer instructions that, when executed by a processor, cause the processor to:

receive a first request message for adjusting a radio link configuration sent by UE;

when determining that the radio link configuration is to be adjusted based on the first request message, generate and send a first response message, wherein the first response message carries first configuration information to which the UE is to be adjusted;

after sending the first response message, monitor within a first preset time period whether there is a second request message for adjusting the radio link configuration sent by the UE; and re-adjust the radio link configuration of the UE based on a monitoring result within the first preset time period.

According to an eighth aspect of the examples of the present disclosure, there is provided a non-transitory computer-readable storage medium storing computer instructions that, when executed by a processor, cause the processor to:

after sending a first request message for adjusting a radio link configuration to a base station, monitor a response message corresponding to the first request message within a second preset time period; and perform a corresponding operation for lowering a device temperature based on a monitoring result within the second preset time period.

Technical solutions according to the examples of the present disclosure may include the following beneficial effects.

When receiving the request message for adjusting the radio link configuration sent by the UE in an overheated status, the base station may send a first response message for adjusting the radio link configuration to the UE, and monitor whether a request message for adjusting the radio link configuration sent by the UE is received within the first preset time period since the first response message is sent. If the request message is not received, the radio link configuration of the UE may be re-adjusted to a higher configuration. Thereby, when the UE is overheated, the temperature of the UE may be lowered by reducing the radio link configuration without traffic data transmission interruption, and the base station may re-adjust the radio link configuration of the UE to a higher configuration when the UE is no longer overheated, so as to meet the user's requirement for the high-speed data transmission.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1A:
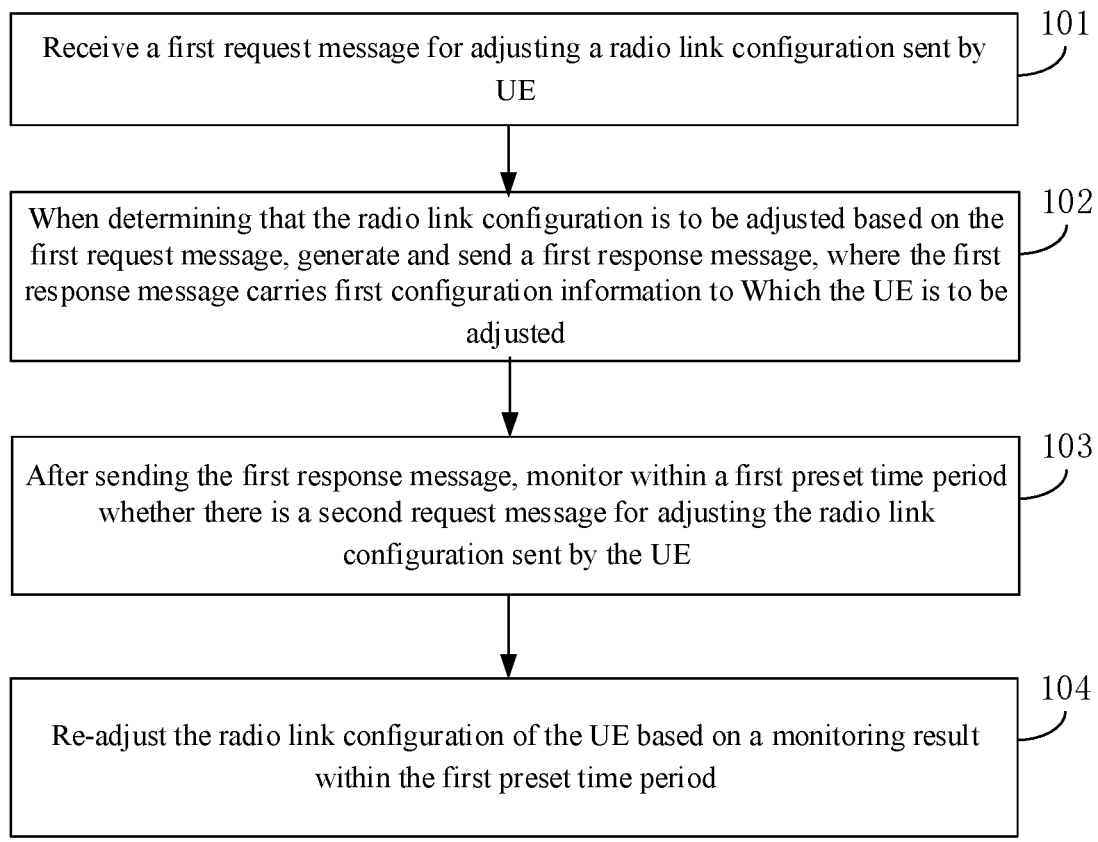
FIG. 1A is a flowchart illustrating a method of protecting user equipment according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 1B:
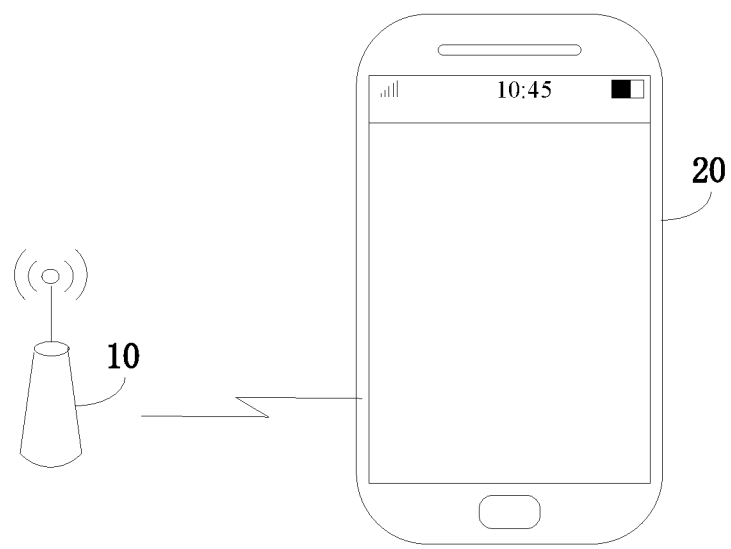
FIG. 1B is a scenario diagram illustrating a method of protecting user equipment according to an example.

FIG. 1A is a flowchart illustrating a method of protecting UE according to an example. FIG. 1B is a scenario diagram illustrating a method of protecting UE according to an example. The method of the UE can be applied to a base station. As shown in FIG. 1A, the method for protecting the UE includes the following steps 101-104.

At step 101, a first request message for adjusting a radio link configuration sent by UE is received.

In an example, the first request message is used to indicate to the base station that the UE currently has a device temperature higher than a preset temperature threshold due to a high radio link configuration.

In an example, the first request message may carry a current device temperature of the UE, a current radio link configuration of the UE, a radio link configuration to which the UE is expected to be adjusted, data information of traffic data to be transmitted by the UE, and the like. For example, the current device temperature of the UE is 85 degrees, a data transmission rate in the current radio link configuration is 6.4 GB/s, a data transmission rate expected to be adjusted to is 1.6 GB/s, and a data buffer amount of the traffic data to be transmitted by the UE is less than 10 MB, and so on.

In an example, the data information of the traffic data to be transmitted may include, but is not limited to, the following information: a data type of the traffic data to be transmitted, a quality of service for the traffic data to be transmitted, a data buffer amount of the traffic data to be transmitted, and the like.

At step 102, when it is determined that the radio link configuration is to be adjusted based on the first request message, a first response message is generated and sent, where the first response message carries first configuration information to which the UE is to be adjusted.

In an example, the base station may determine, according to the current temperature of the UE, the preset temperature threshold, and the data information of the traffic data to be transmitted, whether the radio link configuration needs to be adjusted. For example, the current temperature of the UE is 75 degrees, the preset temperature threshold is 72 degrees, and base station may determine that the current temperature of the UE is not extremely high. And the current data volume of the traffic data to be transmitted is relatively large, and the quality of service for the traffic data is relatively high, so that the base station may determine that the radio link configuration does not need to be adjusted for the moment. In another example, based on other information, the base station may also determine whether the radio link configuration needs to be adjusted for the moment.

In an example, the first response message may further carry a time length of a third preset time period, and after receiving the first response message, the UE may detect, within the third preset time period, whether the device temperature is still too high, that is, whether the device temperature has decreased below the preset temperature threshold. If the device temperature has not decreased below the preset temperature threshold at an end time of the third preset time period, a request message for adjusting the radio link configuration can be sent again. The third preset time period is used to prevent the UE from sending the request message for adjusting the radio link configuration too frequently, and the signaling burden can be reduced.

In an example, the time length of the third preset time period may be set statically. For example, regardless how many degrees the device temperature of the UE is and how many degrees the preset temperature threshold used to limit overheating of the UE is, the time length of the third preset time period is set to 10 minutes.

In an example, the time length of the third preset time period may also be dynamically set. For example, if the current device temperature of the UE is 90 degrees and the preset temperature threshold is 85 degrees, the time length of the third preset time period may be set to 10 minutes. If the current device temperature of the UE is 90 degrees and the preset temperature threshold is 80 degrees, the time length of the third preset time period may be set to 20 minutes. If the current device temperature of the UE is 92 degrees and the preset temperature threshold is 80 degrees, the time length of the third preset time period may be set to 25 minutes.

In an example, the base station may determine the first configuration information according to information carried in the first request message, such as the current device temperature of the UE, the current radio link configuration of the UE, the radio link configuration to which the UE is expected to be adjusted, the traffic data to be transmitted by the UE, and the like.

At step 103, after the first response message is sent, it is monitored within a first preset time period whether there is a second request message for adjusting the radio link configuration sent by the UE.

In an example, a time length of the first preset time period may be the same as the time length of the third preset time period. In another example, the time length of the first preset time period may also be longer than the time length of the third preset time period.

At step 104, the radio link configuration of the UE is re-adjusted based on a monitoring result within the first preset time period.

In an example, when the monitoring result indicates that the second request message is not detected within the first preset time period, a first reconfiguration message is sent to the UE, where the first reconfiguration message carries second configuration information indicating a radio link configuration higher than the radio link configuration indicated by the first configuration information.

In an example, the second configuration information may be the same as the current radio link configuration of the UE carried in the first request message sent by the UE, or may be lower than the current radio link configuration of the UE carried in the first request message sent by the UE.

In an example, when the monitoring result indicates that a second request message is monitored within the first preset time period, based on information carried in the second request message, for example, the device temperature, information on traffic data to be transmitted by the UE, it may be determined whether the radio link configuration needs to be adjusted, and when the radio link configuration needs to be adjusted, step 102 is performed.

In an exemplary scenario, as shown in FIG. 1B, in the scenario shown in FIG. 1B, a base station 10 and UE (such as a smart phone, a tablet, etc.) 20 are included. The base station 10 may send a first response message to the UE 20 when a request message for adjusting radio link configuration is received from the UE 20 and the radio link configuration is agreed to be decreased. The base station 10 may monitor whether a second request message sent by the UE 20 is received within a first preset time period after the first response message is sent. If the second request message is not received, the radio link configuration of the UE can be re-adjusted to a higher configuration. Thus, when the UE is overheated, it can lower the temperature of the UE by reducing the radio link configuration without traffic data transmission interruption, and the base station can re-adjust the radio link configuration of the UE to a higher configuration when the UE is no longer overheated, which can meet a user's requirement for high-speed data transmission.

In this example, through the above steps 101-104, when the base station receives the request message for adjusting the radio link configuration sent by the UE when the UE is overheated, the base station can send the UE the first response message for adjusting the radio link configuration. After sending the first response message, the base station monitors whether a request message for adjusting the radio link configuration sent by the UE is received within the first time period. If the request message is not received, the radio link configuration of the UE may be re-adjusted to a higher configuration. Thus, it can lower the temperature of the UE by reducing the radio link configuration without traffic data transmission interruption, and the base station can re-adjust the radio link configuration of the UE to a higher configuration when the UE is no longer overheated, which can meet a user's requirement for high-speed data transmission.

In an example, re-adjusting the radio link configuration of the UE based on the monitoring result within the first preset time period, includes:

when the monitoring result indicates that the second request message is not detected within the first preset time period, a first reconfiguration message is sent to the UE, where the first reconfiguration message carries second configuration information indicating a radio link configuration higher than the radio link configuration indicated by the first configuration information.

In an example, the method of protecting UE may further include:

when it is determined that the radio link configuration is not to be adjusted based on the first request message, a second response message is generated and sent, where the second response message carries indication information of refusal to adjust the radio link configuration; or when it is determined that the radio link configuration is not to be adjusted based on the first request message, a response message corresponding to the request message is refused to send to the UE.

In an example, the second response message carries a base-station indication time and/or a maximum number of transmission times, where the base-station indication time represents a time for the UE to send the request message again, indicated by a base station, and the maximum number of transmission times represents a maximum number of times for which the UE sends a request message, indicated by the base station.

In an example, the method of protecting UE may further include:

when the UE successfully establishes a radio resource control connection, the base-station indication time and/or the maximum number of transmission times are sent to the UE.

For details on how to protect the UE, please refer to the following examples.

The technical solutions provided by examples of the present disclosure are described below by using specific examples.

Figure 2:
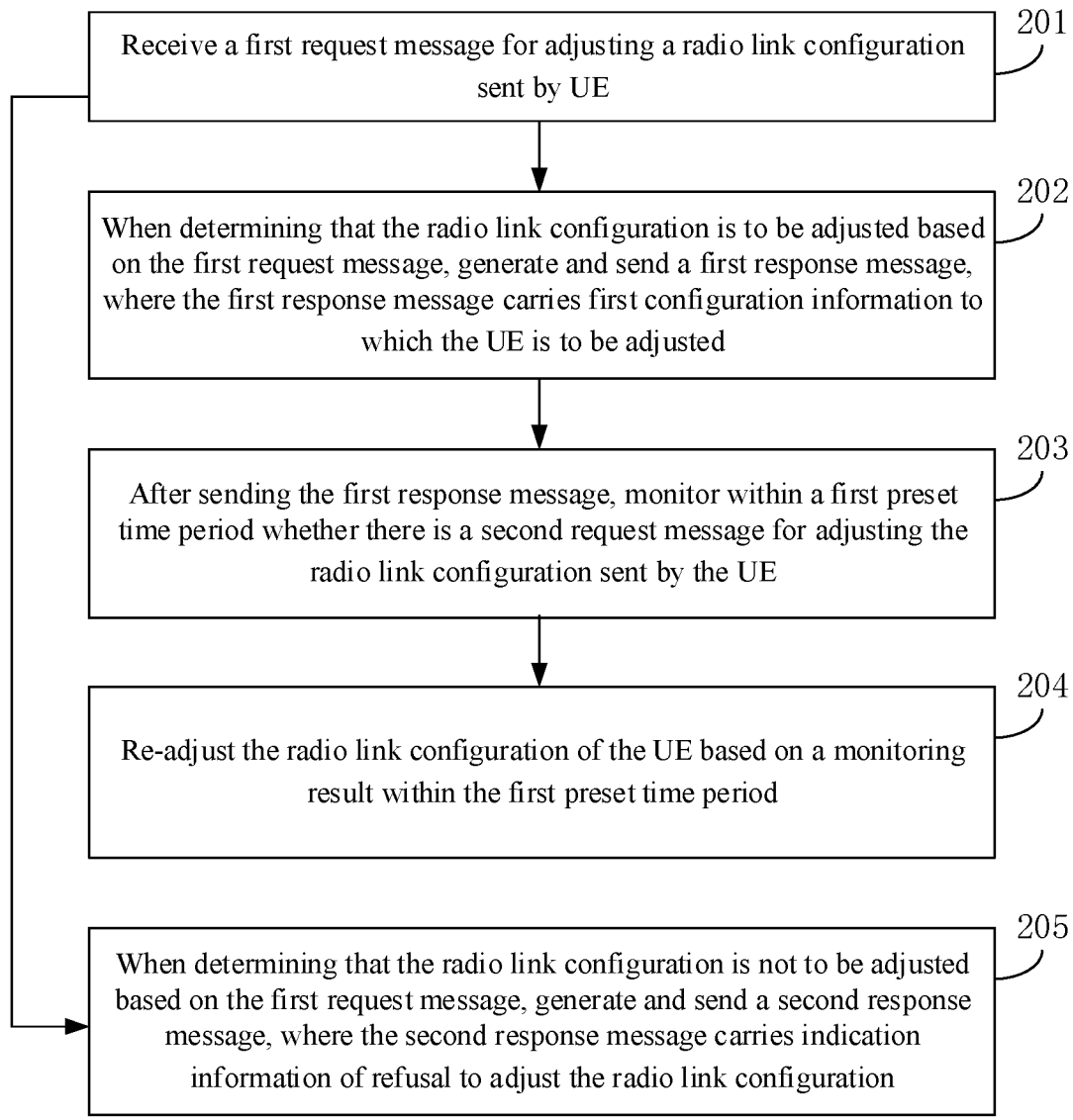
FIG. 2 is a flowchart illustrating another method of protecting user equipment according to an example.

FIG. 2 is a flowchart illustrating another method of protecting UE according to an example. In this example, with the above method provided by the example of the present disclosure, an example of how to prevent UE from frequently sending a request message for reducing a radio link configuration will be illustrated. As shown in FIG. 2, the method includes the following steps.

At step 201, a first request message for adjusting a radio link configuration sent by UE is received, and step 202 and step 205 are performed.

At step 202, when it is determined that the radio link configuration is to be adjusted based on the first request message, a first response message is generated and sent, where the first response message carries first configuration information to which the UE is to be adjusted.

At step 203, after the first response message is sent, it is monitored within a first preset time period whether there is a second request message for adjusting the radio link configuration sent by the UE.

At step 204, the radio link configuration of the UE is re-adjusted based on a monitoring result within the first preset time period.

In an example, the description of steps 201-204 may be referred to the description of the example shown in FIG. 1A, which will not be repeated here.

At step 205, when it is determined that the radio link configuration is not to be adjusted based on the first request message, a second response message is generated and sent, where the second response message carries indication information of refusal to adjust the radio link configuration.

In an example, the second response message may carry a base-station indication time, and the base-station indication time is used to identify a time when the UE can send a second request message, indicated by the base station.

In an example, the base-station indication time may be a time point. For example, a time point after time t1 since receiving the response message may be the base-station indication time, or time T3 may be directly designated as the base-station indication time.

In an example, the second response message may further carry a maximum number of transmission times, where the maximum number of transmission times is used to identify a maximum number of times for which the UE sends a request message, indicated by the base station. For example, sending for three times at most, in order to avoid the UE sending the request message too frequently, and reduce the signaling burden.

In an example, the base-station indication time and/or the maximum number of transmission times may also be sent by the base station to the UE when the UE accesses the network. That is, such configuration information is sent to the UE when a radio resource control connection is successfully established.

In this example, through the above step 201-step 205, when the base station does not agree to reduce the radio link configuration, the base station can send a second response message to the UE, so that the UE can determine how to lower the device temperature based on the information carried in the second response message. For example, by sending a second request message again and when the sending times reaches the maximum number of transmission times, other operations for lowering the device temperature are performed, such as lowering a processing rate of a Central Processing Unit (CPU), disconnecting the radio resource control connection, or shutting down the device, to lower the device temperature.

Figure 3:
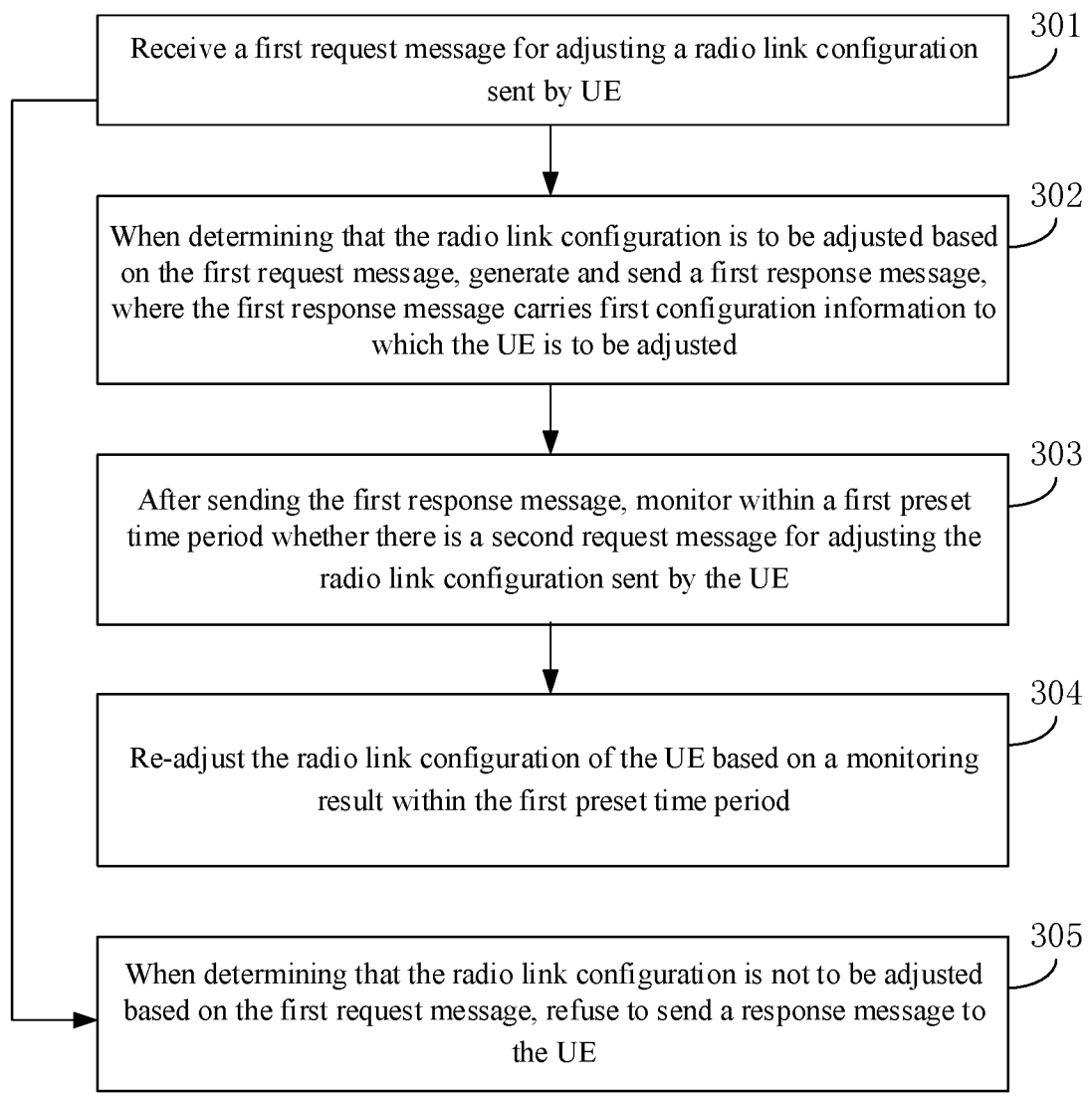
FIG. 3 is a flowchart illustrating another method of protecting user equipment according to an example.

FIG. 3 is a flowchart illustrating another method of protecting UE according to an example. In this example, with the above method provided by the example of the present disclosure, an example of how to prevent UE from frequently sending a request message for reducing a radio link configuration will be illustrated. As shown in FIG. 3, the method includes the following steps.

At step 301, a first request message for adjusting a radio link configuration sent by UE is received, and step 302 and step 305 are performed.

At step 302, when it is determined that the radio link configuration is to be adjusted based on the first request message, a first response message is generated and sent, where the first response message carries first configuration information to which the UE is to be adjusted.

At step 303, after the first response message is sent, it is monitored within a first preset time period whether there is a second request message for adjusting the radio link configuration sent by the UE.

At step 304, the radio link configuration of the UE is re-adjusted based on the monitoring result within the first preset time period.

In an example, the description of steps 301-304 may be referred to the description of the example shown in FIG. 1A, which will not be repeated here.

At step 305, when it is determined that the radio link configuration is not to be adjusted based on the first request message, a response message is refused to be sent to the UE.

In an example, the base station may preset a timer of a second preset time period for the UE, so that the UE starts the timer after sending the first request message, and monitors before the timer expires whether a response message corresponding to the first request message is received. If the response message is not received, it may be determined that the base station refuses to adjust the radio link configuration.

In an example, the base station may further send a base-station indication time and/or a maximum number of transmission times to the UE when the UE accesses the network, so that the UE determines a time to send a second request message again and a number of times for sending a second request message when determining that the base station refuses to adjust the radio link configuration.

In this example, through the above steps 301-305, the base station may refuse to send a response message to the UE when the base station does not agree to reduce the radio link configuration. For example, if the base station considers that the UE overheating caused by the current radio link configuration does not affect further use of the UE, the base station may refuse to send the response message, further reducing the signaling interaction.

Figure 4:
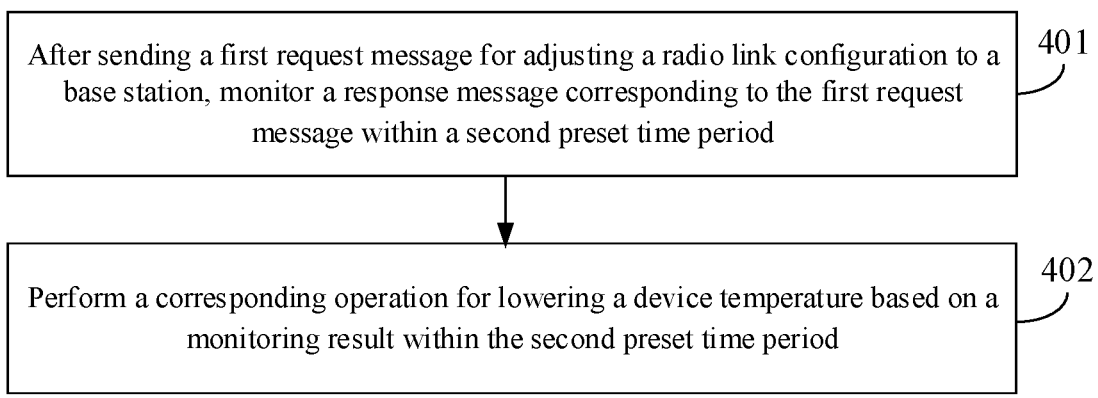
FIG. 4 is a flowchart illustrating a method of protecting user equipment according to an example.

FIG. 4 is a flowchart illustrating a method of protecting UE according to an example, which may be applied to UE. As shown in FIG. 4, the method of protecting UE includes the following steps 401-402.

At step 401, after sending a first request message for adjusting a radio link configuration to a base station, a response message corresponding to the first request message is monitored within a second preset time period.

In an example, a timer that is timed to be a second preset time period may be started when the first request message is sent, and if the timer expires, it may be determined that the time since sending the first request message exceeds the second preset time period. A start time of the second preset time period is a time when the first request message is sent, that is, time counting is started after the first request message is sent.

In an example, a time length of the second preset time period may be set by the base station and indicated to the UE. In another example, the time length of the second preset time period may be set by the UE.

In an example, the UE can send a first request message for adjusting the radio link configuration to the base station when the UE is overheated due to the radio link configuration being too high, and monitor whether a response message is received within a second preset time period since the first request message is sent. The first request message may carry a current device temperature, a preset temperature threshold, a current radio link configuration, and a radio link configuration to which the UE is expected to be adjusted.

In an example, whether the UE is overheated may be determined based on whether the temperature of the UE exceeds the preset temperature threshold and continues for more than a certain time. For example, the UE may be determined as overheated when the temperature of the UE exceeds 85 degrees for 5 minutes. In an example, the temperature of the UE may be a surface temperature of a battery of the UE, a surface temperature of a CPU, a temperature of a front screen of the UE, a temperature of a rear case of the UE, or the like.

At step 402, a corresponding operation for lowering a device temperature is performed based on a monitoring result within the second preset time period.

In an example, the operation for lowering the device temperature may be sending a second request message for reducing the radio link configuration to the base station again. In another example, the operation for lowering the device temperature may also be a preset operation that the UE can perform by itself, for example, reducing a CPU speed, cutting off the network connection, shutting down the UE, restarting the UE, and so on. In still another example, the operation for lowering the device temperature may also be adjusting the radio link configuration based on a response message from the base station.

In an example, based on the monitoring result within the second preset time period, the method for performing the corresponding operations for lowering the device temperature may refer to the examples shown in FIG. 5B to FIG. 5E, which is not described in detailed here.

In an exemplary scenario, as shown in FIG. 1B, in the scenario shown in FIG. 1B, a base station 10 and UE (such as a smart phone, a tablet, etc.) 20 are included. After sending a first request message for adjusting a radio link configuration to the base station, the UE 20 may monitor a response message corresponding to the first request message within a second preset time period. And based on a monitoring result within the second preset time period, the UE 20 performs corresponding operation for lowering a device temperature, instead of sending a request message frequently to the base station at any time after the first request message is sent, which can reduce the occupancy of the spectrum resources and reduce the signaling burden of the network.

In this example, through the above steps 401-402, a timer that is timed to be a second preset time period can be set after the UE is overheated and sends the first request message to the base station. A response message is monitored within the second preset time period, and a sending time for sending a second request message is determined based on the monitoring result. Thus, it can avoid frequently sending a request message to the base station at any time, and can reduce the occupancy of spectrum resources and reduce the signaling burden of the network.

In an example, performing the corresponding operation for lowering the device temperature based on the monitoring result within the second preset time period includes:

when the monitoring result indicates that a response message is not detected within the second preset time period, the device temperature of the UE is detected at an end time of the second preset time period; and when the device temperature of the UE is higher than the preset temperature threshold at the end time of the second preset time period, a second request message for adjusting the radio link configuration is sent at the end time of the second preset time period.

In an example, performing the corresponding operation for lowering the device temperature based on the monitoring result within the second preset time period includes:

when the monitoring result indicates that the response message is detected within the second preset time period and the response message indicates refusal to reduce the radio link configuration, a maximum number of transmission times for the second request message is determined; and when the device temperature of the UE keeps higher than a preset temperature threshold, the second request message to the base station is sent at most the maximum number of transmission times, at a system-appointed time interval.

In an example, the method of protecting UE may further include:

if a number of times for which the second request message has been sent reaches the maximum number of transmission times, while no response message for reducing the radio link configuration sent by the base station is detected yet and the device temperature of the UE is still higher than the preset temperature threshold, a preset operation for lowering the device temperature is performed.

In an example, the method of protecting UE may further include:

when the monitoring result indicates that the response message is detected within the second preset time period and the response message indicates refusal to reduce the radio link configuration, a base-station indication time to send the second request message is determined;

the device temperature of the UE at the base-station indication time is detected; and when the device temperature of the UE at the base-station indication time is higher than the preset temperature threshold, a second request message for adjusting the radio link configuration is sent at the base-station indication time.

In an example, performing the corresponding operation for lowering the device temperature based on the monitoring result within the second preset time period includes:

when the monitoring result indicates that the response message is detected within the second preset time period and the response message indicating reducing the radio link configuration, the device temperature of the UE within the third preset time period is detected, where a start time of the third preset time period is a time when the response message is received; and when the device temperature of the UE within the third preset time period indicates that the UE is still overheated, the second request message for adjusting the radio link configuration is sent at an end time of the third preset time period.

For details on how to protect UE, please refer to the following examples.

The technical solutions provided by the examples of the present disclosure are described in the following specific examples.

Figure 5A:
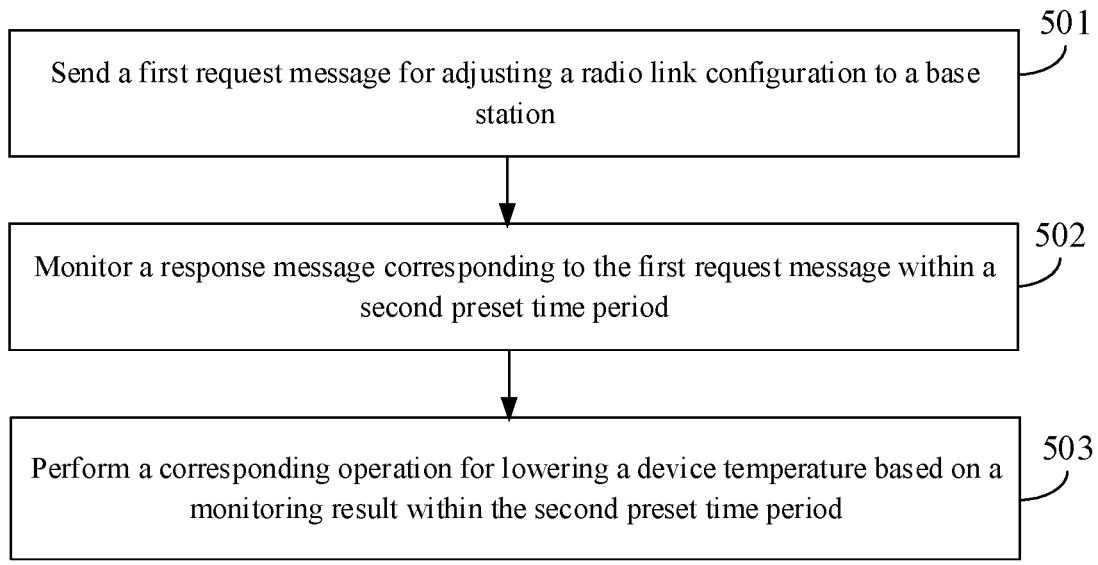
FIG. 5A is a flowchart illustrating another method of protecting user equipment according to an example.
Figure 5B:
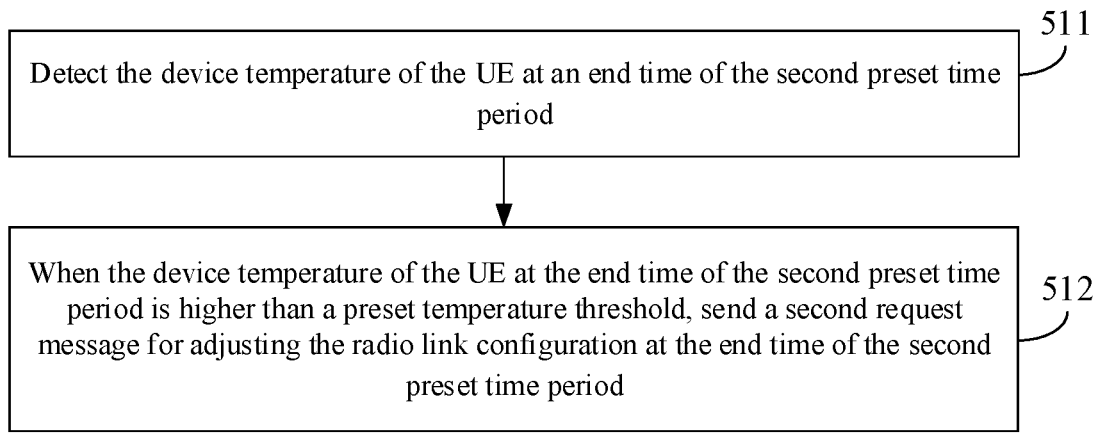
FIG. 5B is flowchart I illustrating a method of performing an operation for lowering a device temperature in the example shown in FIG. 5A.
Figure 5C:
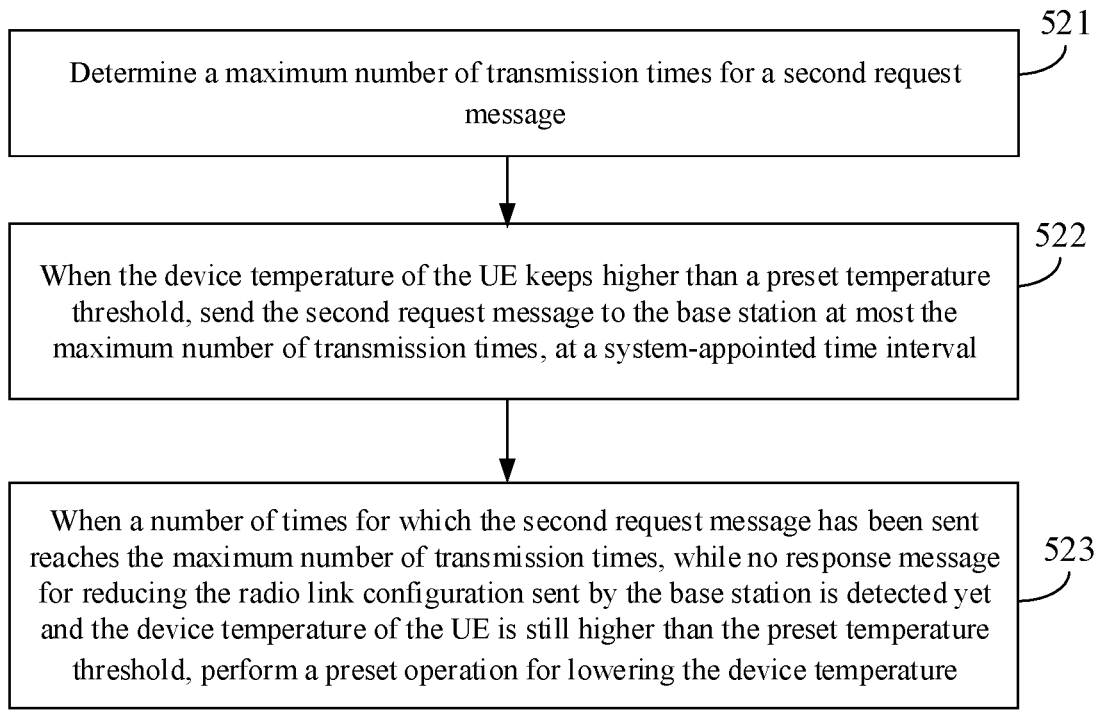
FIG. 5C is flowchart II illustrating a method of performing an operation for lowering a device temperature in the example shown in FIG. 5A.
Figure 5D:
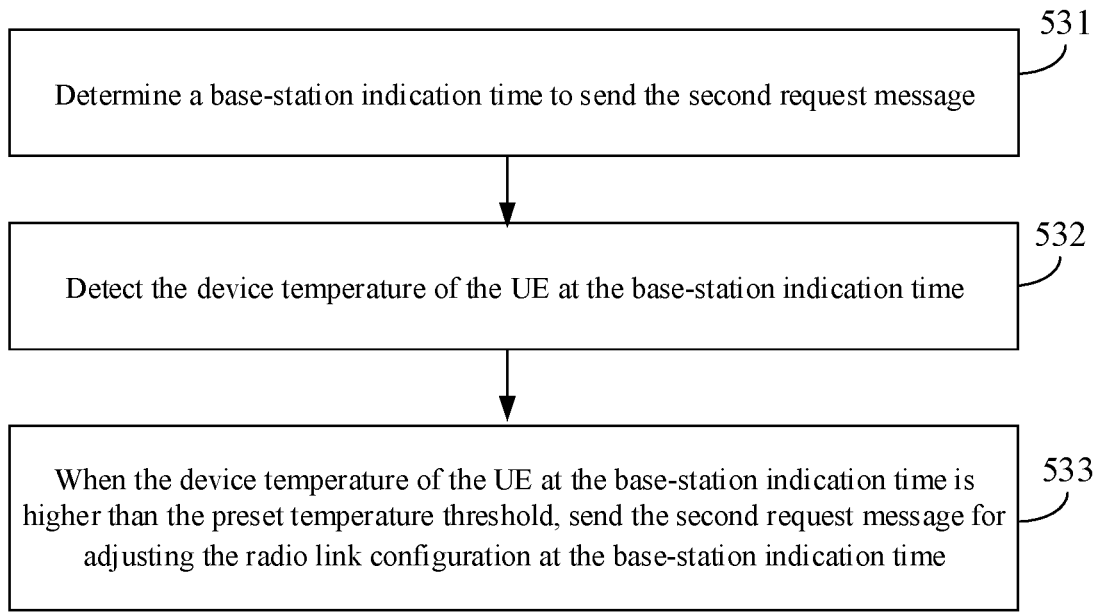
FIG. 5D is flowchart III illustrating a method of performing an operation for lowering a device temperature in the example shown in FIG. 5A.
Figure 5E:
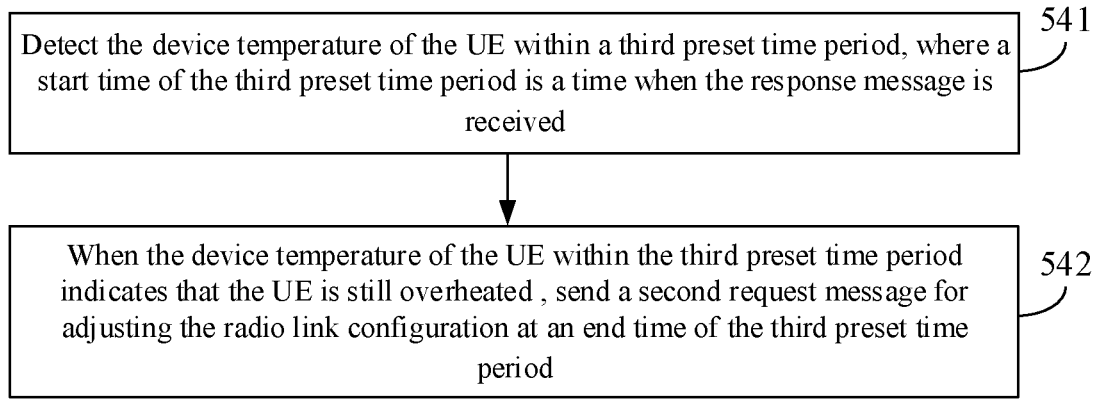
FIG. 5E is flowchart IV illustrating a method of performing an operation for lowering a device temperature in the example shown in FIG. 5A.

FIG. 5A is a flowchart illustrating another method of protecting UE according to an example. FIG. 5B is flowchart I illustrating a method of performing an operation for lowering a device temperature in the example shown in FIG. 5A. FIG. 5C is flowchart II illustrating a method of performing an operation for lowering a device temperature in the example shown in FIG. 5A. FIG. 5D is flowchart III illustrating a method of performing an operation for lowering a device temperature in the example shown in FIG. 5A. FIG. 5E is flowchart IV illustrating a method of performing an operation for lowering a device temperature in the example shown in FIG. 5A. In this example, with the above method provided by the example of the present disclosure, an example of how to send a request message for adjusting a radio link configuration to a base station will be illustrated. As shown in FIG. 5A, the method includes the following steps.

At step 501, a first request message for adjusting a radio link configuration is sent to a base station.

At step 502, a response message corresponding to the first request message is monitored in a second preset time period.

In an example, the description of step 501-step 502 can be referred to the description of step 401 of the example shown in FIG. 4, which will not be repeated here.

At step 503, a corresponding operation for lowering a device temperature is performed based on a monitoring result within the second preset time period.

In an example, when the monitoring result indicates that the response message is not detected within the second preset time period, the operation of lowering the device temperature may be performed according to the example shown in FIG. 5B. As shown in FIG. 5B, the following steps are included.

At step 511, a device temperature of the UE at an end time of the second preset time period is detected.

At step 512, when the device temperature of the UE at the end time of the second preset time period is higher than a preset temperature threshold, a second request message for adjusting the radio link configuration is sent at the end time of the second preset time period.

In an example, the second request message may be consistent with the first request message. For example, when the device temperature has not changed within the second preset time period, the second request message and the first request message may be consistent, that is, contents carried in the request messages are the same. In an example, the second request message may be inconsistent with the first request message. For example, when the device temperature has changed during the second preset time period, the second request message may be inconsistent with the first request message, that is, the contents carried in the request messages are different.

In an example, since the UE keeps in an overheated state, and the response message for reducing the radio link configuration is not detected within the second preset time period, it may be determined whether the UE is still overheated merely based on whether the device temperature at the end time of the second preset time period is higher than the preset temperature threshold. When it is determined that the UE is still overheated, the end time of the second time period is determined as a sending time for sending the second request message. For example, the time length of the second preset time period is 5 minutes, and the time counting starts after the first request message is sent at 11:35. If the response message is not received before 11:40, the second request message is sent at 11:40.

In an example, when the monitoring result indicates that a response message is detected within the second preset time period and the response message indicates refusal to reduce the radio link configuration, an operation for lowering the device temperature may be performed according to examples shown in FIG. 5C and FIG. 5D. As shown in FIG. 5C, the following steps are included.

At step 521, a maximum number of transmission times for a second request message is determined.

In an example, the maximum number of transmission times is used to limit a number of times for which the UE sends the second request message. For example, the UE may be configured to send the second request message for at most three times. After sending the second request message for three times, even if the base station still does not allow the radio link configuration to be adjusted and the UE is still overheated, the second request message is not allowed to be sent again, so as to prevent the UE from sending the second request message too frequently, thereby reducing the signaling burden.

In an example, the maximum number of transmission times may be analyzed from the response message. In another example, the base station may also send the maximum number of transmission times to the UE when the UE establishes a radio resource control connection, so that the UE can record the maximum number of transmission times in local.

At step 522, when a device temperature of the UE keeps higher than a preset temperature threshold, the second request message is sent to the base station for no more than the maximum number of transmission times at a system-appointed time interval.

At step 523, if a number of times for which the second request message has been sent reaches the maximum number of transmission times, no response message for reducing the radio link configuration from the base station is detected yet, and the device temperature of the UE is still higher than the preset temperature threshold, a preset operation for lowering the device temperature is performed.

In an example, the preset operation may be understood as an operation that the UE can perform by itself, such as, reducing a CPU speed, cutting off a network connection, shutting down the UE, restarting the UE, and the like.

As shown in FIG. 5D, the following steps are included.

At step 531, a base-station indication time for sending a second request message is determined.

In an example, the base-station indication time may be a time point. For example, a time point after time t1 since receiving the response message may be the base-station indication time, or time T3 may be directly designated as the base-station indication time.

At step 532, a device temperature of the UE at the base-station indication time is detected.

In an example, it may be determined whether the second request message is sent at the base-station indication time by further detecting whether the device temperature at the base-station indication time is higher than the preset temperature threshold.

At step 533, when the device temperature of the UE at the base-station indication time is higher than the preset temperature threshold, the second request message for adjusting the radio link configuration is sent at the base-station indication time.

In an example, when the monitoring result indicates that the response message is detected within the second preset time period and the response message indicating reducing the radio link configuration, the operation of lowering the device temperature is performed according to the example shown in FIG. 5E. As shown in FIG. 5E, the following steps are included.

At step 541, a device temperature of the UE within a third preset time period is detected, where a start time of the third preset time period is a time when the response message is received.

In an example, the third preset time period can be understood as a time period for solving UE overheating. That is, after the base station adjusts the radio link configuration of the UE based on the first request message, the device temperature of the UE is allowed to be higher than a preset temperature threshold for a maximum length of time. If the device temperature is higher than the preset temperature threshold within the third preset time period since the radio link configuration is lowered, a request message for adjusting the radio link configuration is not allowed to be sent to the base station. If the device temperature is still higher than the preset temperature threshold after the third preset time period since the radio link configuration is lowered, a second request message for adjusting the radio link configuration may be sent to the base station again at an end time of the third preset time period.

In an example, a time length of the third preset time period may be set by the base station and indicated to the UE. In another example, the time length of the third preset time period may be set by the UE.

In an example, the time length of the third preset time period may be statically set. For example, regardless how many degrees the device temperature of the UE is and how many degrees the preset temperature threshold used to limit overheating of the UE is, the time length of the third preset time period is set to 10 minutes.

In an example, the time length of the third preset time period may also be dynamically set. For example, if the current device temperature of the UE is 90 degrees and the preset temperature threshold is 85 degrees, the time length of the third preset time period may be set to 10 minutes. If the current device temperature of the UE is 90 degrees and the preset temperature threshold is 80 degrees, the time length of the third preset time period may be set to 20 minutes. If the current device temperature of the UE is 92 degrees and the preset temperature threshold is 80 degrees, the time length of the third preset time period may be set to 25 minutes.

At step 542, when the device temperature of the UE within the third preset time period indicates that the UE is still overheated, a second request message for adjusting the radio link configuration is sent at the end time of the third preset time period.

In an example, if the temperature of the UE keeps decreasing during the third preset time period and the device temperature of the UE has decreased below the preset temperature threshold at the end time of the third preset time period, it can be determined that the UE is no longer overheated. For example, the preset temperature threshold is 85 degrees, and if the device temperature is lowered from 90 degrees to 84 degrees within the third preset time period since the radio link configuration is adjusted, it can be determined that the UE is no longer overheated. In another example, if the device temperature of the UE keeps decreasing during the third preset time period, and the device temperature of the UE has decreased to approximately the preset temperature threshold at the end time of the third preset time period, it can still be determined that the UE is no longer overheated. For example, the preset temperature threshold is 85 degrees, and if the device temperature is lowered from 90 degrees to 86 degrees within the third preset time period since the radio link configuration is adjusted, and if a change curve of the device temperature is continuously decreasing, it can be inferred that the UE can be further lowered to less than 85 degrees after a short time period, so it can also be determined that the UE is no longer overheated.

In this example, through the above steps 501-503, a timer that is timed to be a second preset time period can be set after the UE is overheated and sends the first request message to the base station. A response message is monitored within the second preset time period, and a sending time for sending the second request message is determined based on the monitoring result. Thus, it can avoid frequently sending a request message to the base station at any time, and can reduce the occupancy of spectrum resources and reduce the signaling burden of the network.

Figure 6:
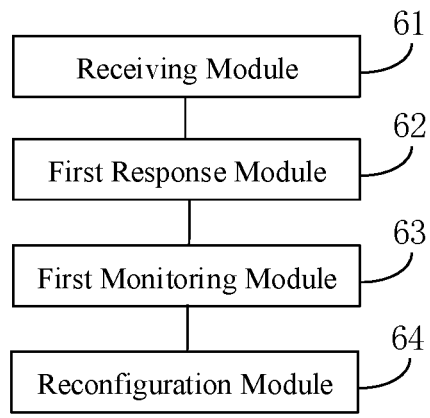
FIG. 6 is a block diagram illustrating an apparatus for protecting user equipment according to an example.

FIG. 6 is a block diagram of an apparatus for protecting UE. The apparatus is applied to a base station. As shown in FIG. 6, the apparatus for protecting UE includes:

a receiving module 61 configured to receive a first request message for adjusting a radio link configuration sent by UE;

a first response module 62 configured to, when it is determined that the radio link configuration is to be adjusted based on the first request message received by the receiving module 61, generate and send a first response message, wherein the first response message carries first configuration information to which the UE is to be adjusted;

a first monitoring module 63 configured to, after the first response module 62 sends the first response message, monitor within a first preset time period whether there is a second request message for adjusting the radio link configuration sent by the UE; and a reconfiguration module 64 configured to re-adjust the radio link configuration of the UE based on a monitoring result within the first preset time period from the first monitoring module 63.

Figure 7:
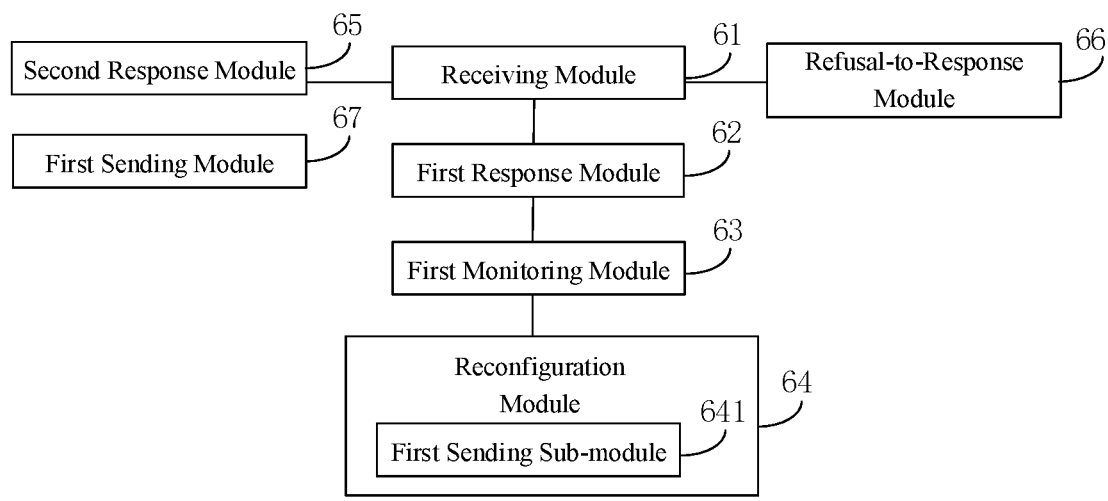
FIG. 7 is a block diagram illustrating another apparatus for protecting user equipment according to an example.

FIG. 7 is a block diagram of another apparatus for protecting UE according to an example. As shown in FIG. 7, on the basis of the above example shown in FIG. 6, in an example, the configuration module 64 includes:

a first sending sub-module 641 configured to, when the monitoring result indicates that the second request message is not detected within the first preset time period, send a first reconfiguration message to the UE, wherein the first reconfiguration message carries second configuration information indicating a radio link configuration higher than that indicated by the first configuration information.

In an example, the apparatus further includes:

a second response module 65 configured to, when it is determined that the radio link configuration is not to be adjusted based on the first request message, generate and send a second response message, wherein the second response message carries indication information of refusal to adjust the radio link configuration; or a refusal-to-response module 66 configured to, when determining that the radio link configuration is not to be adjusted based on the first request message, refuse to send the UE a response message corresponding to the request message.

In an example, the second response message carries a base-station indication time and/or a maximum number of transmission times, the base-station indication time representing a time for the UE to send the request message again, indicated by a base station, and the maximum number of transmission times representing a maximum number of times for which the UE sends the request message, indicated by the base station.

In an example, the apparatus further includes:

a first sending module 67 configured to send the base-station indication time and/or the maximum number of transmission times to the UE when the UE successfully establishes a radio resource control connection.

Figures 8, 9:
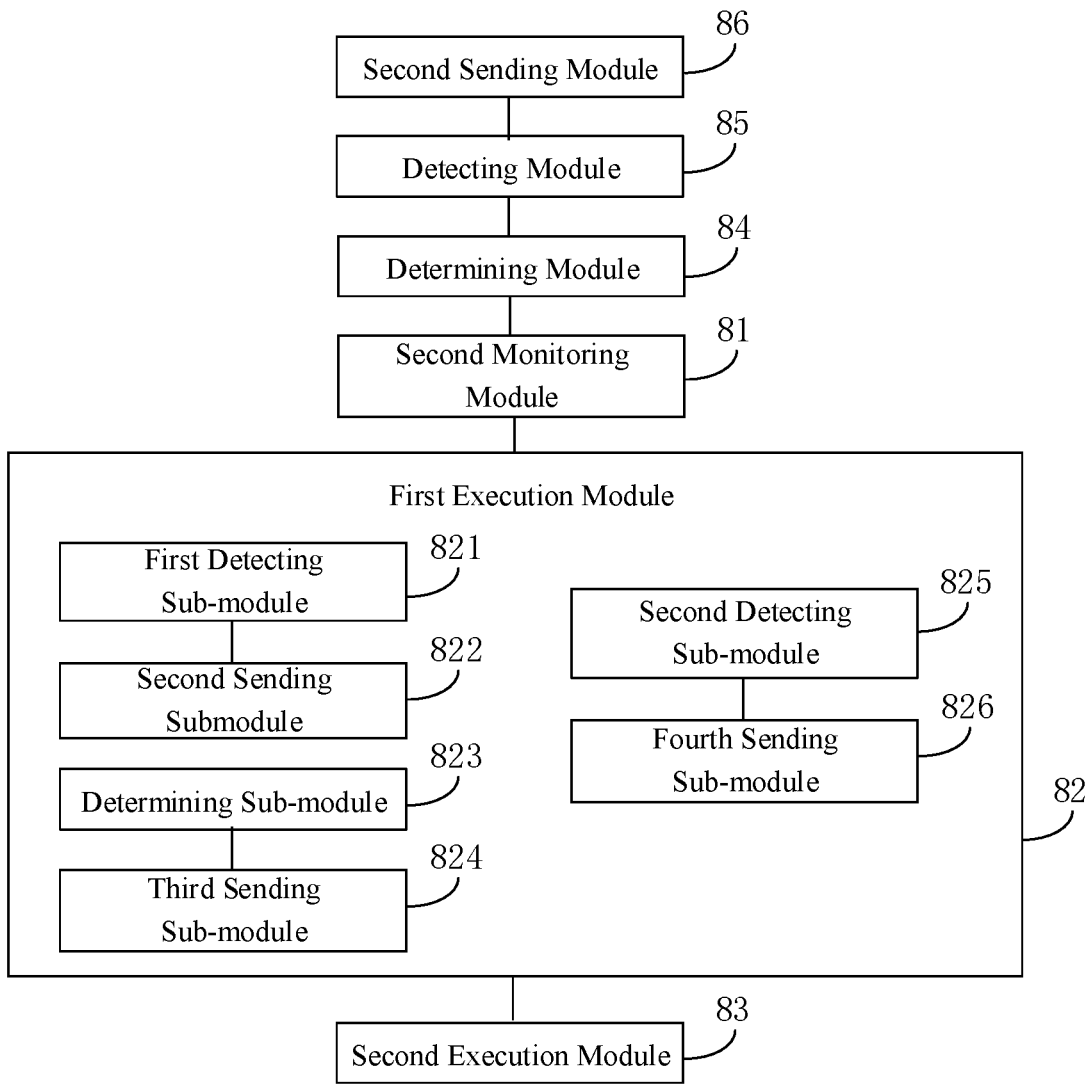
FIG. 8 is a block diagram illustrating an apparatus for protecting user equipment according to an example.
FIG. 9 is a block diagram illustrating another apparatus for protecting user equipment according to an example.

FIG. 8 is a block diagram of an apparatus for protecting UE. The apparatus is applied to UE. As shown in FIG. 8, the apparatus for protecting UE includes:

a second monitoring module 81 configured to, after a first request message for adjusting a radio link configuration is sent to a base station, monitor a response message corresponding to the first request message within a second preset time period; and a first execution module 82 configured to perform a corresponding operation for lowering a device temperature based on a monitoring result within the second preset time period.

FIG. 9 is a block diagram of another apparatus for protecting UE according to an example. As shown in FIG. 9, on the basis of the above example shown in FIG. 8, in an example, the execution module 82 includes:

a first detecting sub-module 821 configured to, when the monitoring result indicates that the response message is not detected within the second preset time period, detect the device temperature of the UE at an end time of the second preset time period; and a second sending sub-module 822 configured to, when the device temperature of the UE at the end time of the second preset time period, detected by the first detecting sub-module 821, is higher than a preset temperature threshold, send a second request message for adjusting the radio link configuration at the end time of the second preset time period.

In an example, the first execution module 82 includes:

a determining sub-module 823 configured to, when the monitoring result indicates that the response message is detected within the second preset time period and the response message indicates refusal to reduce the radio link configuration, determine a maximum number of transmission times for a second request message; and a third sending sub-module 824 configured to, when the device temperature of the UE keeps higher than a preset temperature threshold, send the second request message to the base station, at most the maximum number of transmission times, at a system-appointed time interval.

In an example, the apparatus further includes:

a second execution module 83 configured to, when a number of times for which the second request message has been sent reaches the maximum number of transmission times, while no response message for reducing the radio link configuration sent by the base station is detected yet and the device temperature of the UE is still higher than the preset temperature threshold, perform a preset operation for lowering the device temperature.

In an example, the apparatus further includes:

a determining module 84 configured to, when the monitoring result indicates that the response message is detected within the second preset time period and the response message indicates refusal to reduce the radio link configuration, determine a base-station indication time to send the second request message;

a detecting module 85 configured to detect the device temperature of the UE at the base-station indication time; and a second sending module 86 configured to, when the device temperature of the UE at the base-station indication time is higher than the preset temperature threshold, send the second request message for adjusting the radio link configuration at the base-station indication time.

In an example, the first execution module 82 includes:

a second detecting sub-module 825 configured to, when the monitoring result indicates that the response message is detected within the second preset time period and the response message indicates reducing the radio link configuration, detect the device temperature of the UE within a third preset time period, wherein a start time of the third preset time period is a time when the response message is received; and a fourth sending sub-module 826 configured to, when the device temperature of the UE within the third preset time period indicates that the UE is still overheated, send a second request message for adjusting the radio link configuration at an end time of the third preset time period.

Figure 10:
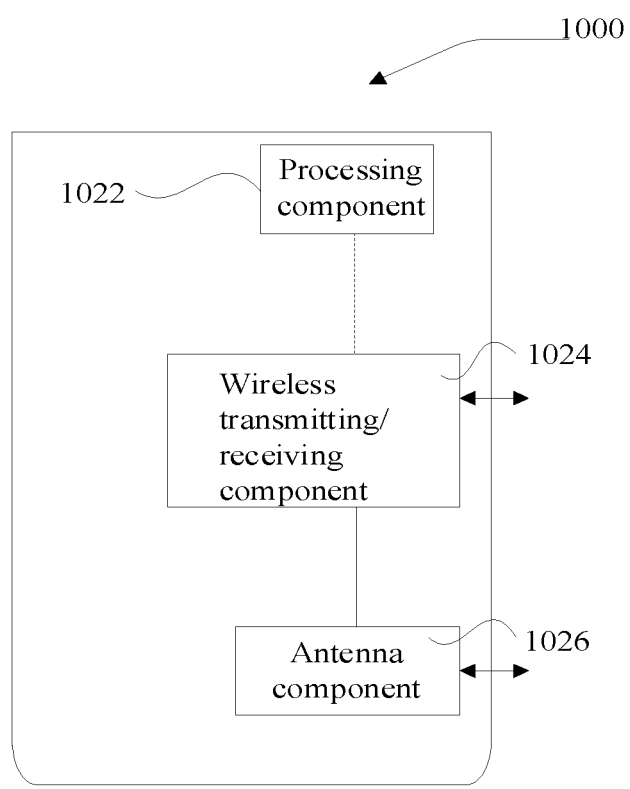
FIG. 10 is a block diagram illustrating an apparatus suitable for protecting user equipment according to an example.

FIG. 10 is a block diagram of an apparatus for protecting UE according to an example. An apparatus 1000 can be provided as a base station. Referring to FIG. 10, The apparatus 1000 includes a processing component 1022, a wireless transmitting/receiving component 1024, an antenna component 1026, and a signal processing portion specific to a wireless interface. The processing component 1022 can further include one or more processors.

One processor of the processing components 1022 can be configured to perform the method of protecting UE as disclosed in the first aspect above.

In an example, there is also provided a non-transitory computer-readable storage medium including instructions executable by the processing component 1022 of the apparatus 1000 to perform the above method. For example, the non-transitory computer readable storage medium can be a Read-Only Memory (ROM), a Random Access Memory (RAM), a Compact Disc Read-Only Memory (CD-ROM), a magnetic tape, a floppy disk, and an optical data storage device.

The non-transitory computer-readable storage medium, when the instructions in the storage medium are executed by a processor of the base station, the base station is caused to perform the method of protecting UE disclosed in the first aspect, including:

receiving a first request message for adjusting a radio link configuration sent by UE;

when determining that the radio link configuration is to be adjusted based on the first request message, generating and sending a first response message, wherein the first response message carries first configuration information to which the UE is to be adjusted;

after sending the first response message, monitoring within a first preset time period whether there is a second request message for adjusting the radio link configuration sent by the UE; and re-adjusting the radio link configuration of the UE based on a monitoring result within the first preset time period.

Figure 11:
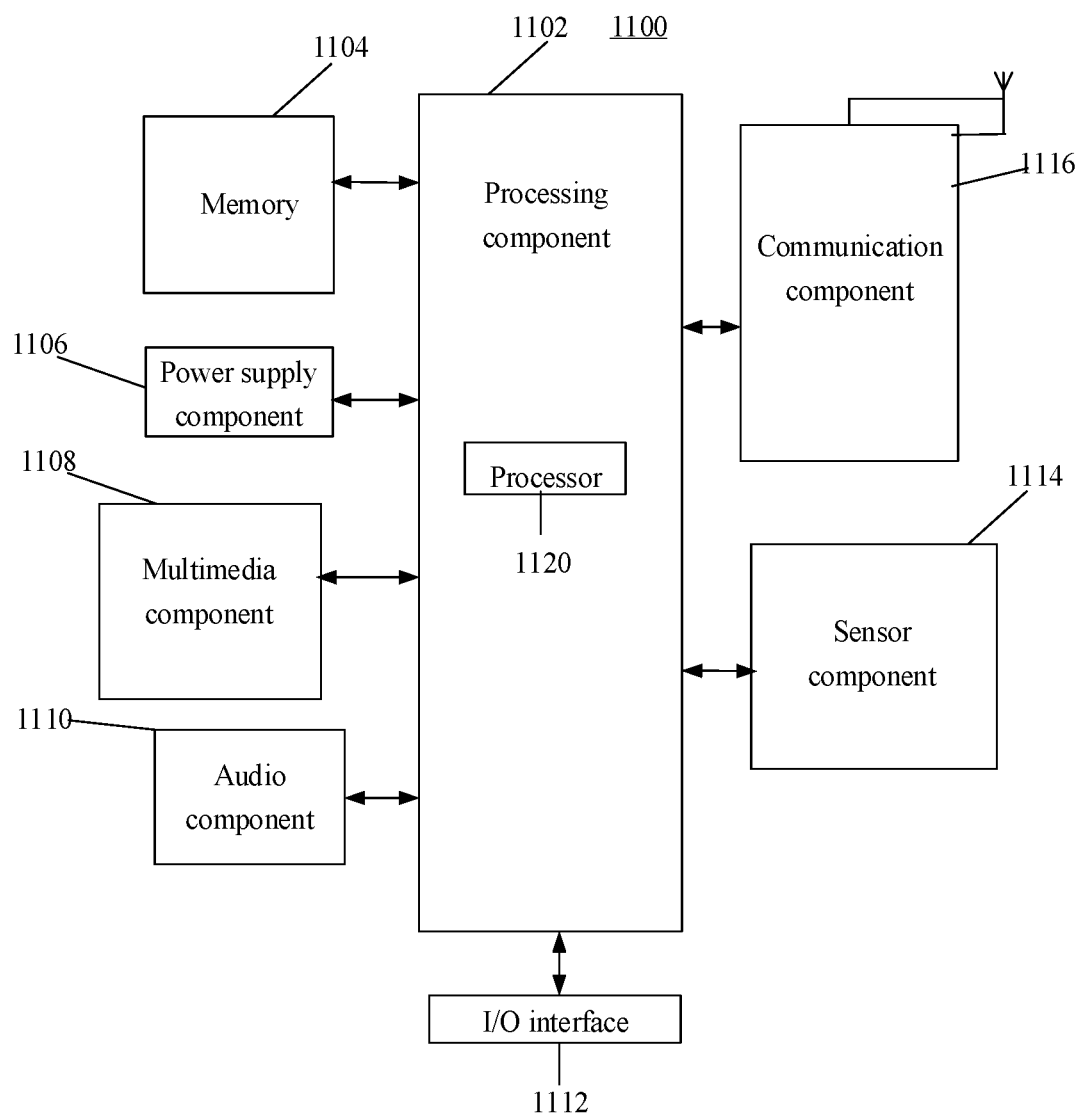
FIG. 11 is a block diagram illustrating an apparatus suitable for protecting user equipment according to an example.

FIG. 11 is a block diagram of an apparatus for protecting UE according to an example. For example, an apparatus 1100 can be UE, such as a smart phone.

As shown in FIG. 11, the apparatus 1100 may include one or more of the following components: a processing component 1102, a memory 1104, a power supply component 1106, a multimedia component 1108, an audio component 1110, an input/output (I/O) interface 1112, a sensor component 1114, and a communication component 1116.

The processing component 1102 generally controls overall operations of the apparatus 1100, such as operations associated with display, phone calls, data communications, camera operations, and recording operations. The processing component 1102 may include one or more processors 1120 to execute instructions to complete all or part of the steps of the above methods. In addition, the processing component 1102 may include one or more modules which facilitate the interaction between the processing component 1102 and other components. For example, the processing component 1102 may include a multimedia module to facilitate the interaction between the multimedia component 1108 and the processing component 1102.

The memory 1104 is to store various types of data to support the operation of the apparatus 1100. Examples of such data include instructions for any application or method operated on the apparatus 1100, messages, pictures, and so on. The memory 1104 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a ROM, a magnetic memory, a flash memory, a magnetic or compact disk.

The power supply component 1106 supplies power for different components of the apparatus 1100. The power supply component 1106 may include a power supply management system, one or more power supplies, and other components associated with generating, managing and distributing power for the apparatus 1100.

The multimedia component 1108 includes a screen providing an output interface between the apparatus 1100 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1108 may include a front camera and/or a rear camera. The front camera and/or rear camera may receive external multimedia data when the apparatus 1100 is in an operating mode, such as a photographing mode or a video mode. Each of the front camera and the rear camera may be a fixed optical lens system or have focal length and optical zooming capability.

The audio component 1110 is to output and/or input an audio signal. For example, the audio component 1110 includes a microphone (MIC). When the apparatus 1100 is in an operating mode, such as a call mode, a record mode and a voice recognition mode, the microphone is to receive an external audio signal. The received audio signal may be further stored in the memory 1104 or sent via the communication component 1116. In some examples, the audio component 1110 further includes a speaker for outputting an audio signal.

The I/O interface 1112 provides an interface between the processing component 1102 and a peripheral interface module. The above peripheral interface module may be a keyboard, a click wheel, buttons, or the like. These buttons may include but not limited to, a home button, a volume button, a start button and a lock button.

The sensor component 1114 includes one or more sensors to provide status assessments of various aspects for the apparatus 1100. For example, the sensor component 1114 may detect the on/off status of the apparatus 1100, and relative positioning of component, for example, the component is a display and a keypad of the apparatus 1100. The sensor component 1114 may also detect a change in position of the apparatus 1100 or a component of the apparatus 1100, a presence or absence of the contact between a user and the apparatus 1100, an orientation or an acceleration/deceleration of the apparatus 1100, and a change in temperature of the apparatus 1100. The sensor component 1114 may include a proximity sensor to detect the presence of a nearby object without any physical contact. The sensor component 1114 may further include an optical sensor, such as a Complementary Metal-Oxide-Semiconductor (CMOS) or Charged Coupled Device (CCD) image sensor which is used in imaging applications. In some examples, the sensor component 1114 may further include an acceleration sensor, a gyroscope sensor, a magnetic sensor, a distance sensor, a pressure sensor, or a temperature sensor.

The communication component 1116 is to facilitate wired or wireless communication between the apparatus 1100 and other devices. The apparatus 1100 may access a wireless network based on a communication standard, such as Wi-Fi, 2G or 3G, or a combination thereof. In an example, the communication component 1116 receives a broadcast signal or broadcast related information from an external broadcast management system via a broadcast channel. In an example, the communication component 1116 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In an example, the apparatus 1100 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the method as described in the above second aspect.

In an example, there is further provided a non-transitory computer-readable storage medium including instructions, such as the memory 1104 including instructions. The instructions may be executed by the processor 1120 of the apparatus 1100 to complete the above method. For example, the non-transitory computer readable storage medium may be a ROM, a RAM, a CD-ROM, a magnetic tape, a floppy disk, an optical data storage device, and so on.

The non-transitory computer-readable storage medium, when instructions in the storage medium are executed by a processor of the apparatus, the apparatus is caused to perform the method of protecting UE of the first aspect, the method including:

after sending a first request message for adjusting a radio link configuration to a base station, monitoring a response message corresponding to the first request message within a second preset time period; and performing a corresponding operation for lowering a device temperature based on a monitoring result within the second preset time period.

Other implementations of the present disclosure will be apparent to those skilled in the art from consideration of the specification and practice of the present disclosure herein. The present application is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of protecting User Equipment (UE), comprising:
receiving a first request message for adjusting a radio link configuration sent by the UE;
upon determining that the radio link configuration is to be adjusted based on the first request message, generating and sending a first response message, wherein the first response message carries first configuration information indicating a first configuration of radio link to which the UE is to be adjusted;
after sending the first response message, monitoring within a first preset time period whether there is a second request message for adjusting the radio link configuration sent by the UE;
re-adjusting the radio link configuration of the UE based on a monitoring result within the first preset time period; and
upon determining that the radio link configuration is not to be adjusted based on the first request message, performing one of following acts:
generating and sending a second response message, wherein the second response message carries indication information of refusal to adjust the radio link configuration; or
refusing to send the UE a response message corresponding to the request message.

2. The method according to claim 1, wherein re-adjusting the radio link configuration of the UE based on the monitoring result within the first preset time period comprises:

when the monitoring result indicates that the second request message is not detected within the first preset time period, sending a first reconfiguration message to the UE, wherein the first reconfiguration message carries second configuration information indicating a second configuration of radio link higher than the first configuration of radio link indicated by the first configuration information.

3. The method according to claim 1, wherein the second response message carries a base-station indication time and/or a maximum number of transmission times, the base-station indication time representing a time indicated by a base station for the UE to re-send the request message, and the maximum number of transmission times representing a maximum number of times for which the UE sends the request message, which is indicated by the base station.

4. A method of protecting User Equipment (UE), comprising:
sending a first request message for adjusting a radio link configuration to a base station;
monitoring a response message corresponding to the first request message within a second preset time period; and
performing a corresponding operation for lowering a device temperature of the UE based on a monitoring result within the second preset time period;
wherein performing the corresponding operation for lowering the device temperature of the UE based on the monitoring result within the second preset time period comprises:
when the monitoring result indicates that the response message is not detected within the second preset time period, detecting the device temperature of the UE at an end time of the second preset time period; and
when the device temperature of the UE at the end time of the second preset time period is higher than a preset temperature threshold, sending a second request message for adjusting the radio link configuration at the end time of the second preset time period.

5. The method according to claim 4, wherein performing the corresponding operation for lowering the device temperature of the UE based on the monitoring result within the second preset time period further comprises:
when the monitoring result indicates that the response message is detected within the second preset time period and the response message indicates refusal to reduce the radio link configuration, determining a maximum number of transmission times for a second request message; and
when the device temperature of the UE keeps higher than a preset temperature threshold, sending the second request message to the base station, a number of times not exceeding the maximum number of transmission times, at a system-appointed time interval.

6. The method according to claim 5, further comprising:
when the number of times for which the second request message has been sent reaches the maximum number of transmission times, while no response message for reducing the radio link configuration sent by the base station is detected yet and the device temperature of the UE is still higher than the preset temperature threshold, performing a preset operation for lowering the device temperature of the UE.

7. The method according to claim 5, further comprising:
when the monitoring result indicates that the response message is detected within the second preset time period and the response message indicates refusal to reduce the radio link configuration, determining a base-station indication time to send the second request message;
detecting the device temperature of the UE at the base-station indication time; and
when the device temperature of the UE at the base-station indication time is higher than the preset temperature threshold, sending the second request message for adjusting the radio link configuration at the base-station indication time.

8. The method according to claim 4, wherein performing the corresponding operation for lowering the device temperature of the UE based on the monitoring result within the second preset time period further comprises:
when the monitoring result indicates that the response message is detected within the second preset time period and the response message indicates reducing the radio link configuration, detecting the device temperature of the UE within a third preset time period, wherein a start time of the third preset time period is a time when the response message is received; and
when the device temperature of the UE within the third preset time period indicates that the UE is still overheated, sending a second request message for adjusting the radio link configuration at an end time of the third preset time period.

9. A base station, comprising:
a processor; and
a memory storing instructions executable by the processor,
wherein the processor is configured to:
receive a first request message for adjusting a radio link configuration sent by UE;
upon determining that the radio link configuration is to be adjusted based on the first request message, generate and send a first response message, wherein the first response message carries first configuration information indicating a first configuration of radio link to which the UE is to be adjusted;
after sending the first response message, monitor within a first preset time period whether there is a second request message for adjusting the radio link configuration sent by the UE;
re-adjust the radio link configuration of the UE based on a monitoring result within the first preset time period; and
upon determining that the radio link configuration is not to be adjusted based on the first request message, perform one of following acts:
generating and sending a second response message, wherein the second response message carries indication information of refusal to adjust the radio link configuration; or
refusing to send the UE a response message corresponding to the request message.

10. The base station according to claim 9, wherein re-adjusting the radio link configuration of the UE based on the monitoring result within the first preset time period comprises:
when the monitoring result indicates that the second request message is not detected within the first preset time period, sending a first reconfiguration message to the UE, wherein the first reconfiguration message carries second configuration information indicating a second configuration of radio link higher than the first configuration of radio link indicated by the first configuration information.

11. The base station according to claim 9, wherein the second response message carries a base-station indication time and/or a maximum number of transmission times, the base-station indication time representing a time indicated by a base station for the UE to re-send the request message, and the maximum number of transmission times representing a maximum number of times for which the UE sends the request message, which is indicated by the base station.

12. User equipment (UE), comprising:
a processor; and
a memory storing instructions executable by the processor,
wherein the processor is configured to:
send a first request message for adjusting a radio link configuration to a base station;
monitor a response message corresponding to the first request message within a second preset time period; and
perform a corresponding operation for lowering a device temperature of the UE based on a monitoring result within the second preset time period;
wherein performing the corresponding operation for lowering the device temperature of the UE based on the monitoring result within the second preset time period comprises:
when the monitoring result indicates that the response message is not detected within the second preset time period, detecting the device temperature of the UE at an end time of the second preset time period; and
when the device temperature of the UE at the end time of the second preset time period is higher than a preset temperature threshold, sending a second request message for adjusting the radio link configuration at the end time of the second preset time period.

13. The UE according to claim 12, wherein performing the corresponding operation for lowering the device temperature of the UE based on the monitoring result within the second preset time period further comprises:
when the monitoring result indicates that the response message is detected within the second preset time period and the response message indicates refusal to reduce the radio link configuration, determining a maximum number of transmission times for a second request message; and
when the device temperature of the UE keeps higher than a preset temperature threshold, sending the second request message to the base station, a number of times not exceeding the maximum number of transmission times, at a system-appointed time interval.

14. The UE according to claim 13, the processor is further configured to:
when the number of times for which the second request message has been sent reaches the maximum number of transmission times, while no response message for reducing the radio link configuration sent by the base station is detected yet and the device temperature of the UE is still higher than the preset temperature threshold, perform a preset operation for lowering the device temperature of the UE.

15. The UE according to claim 13, the processor is further configured to:
when the monitoring result indicates that the response message is detected within the second preset time period and the response message indicates refusal to reduce the radio link configuration, determine a base-station indication time to send the second request message;
detect the device temperature of the UE at the base-station indication time; and
when the device temperature of the UE at the base-station indication time is higher than the preset temperature threshold, send the second request message for adjusting the radio link configuration at the base-station indication time.

16. The UE according to claim 12, wherein performing the corresponding operation for lowering the device temperature of the UE based on the monitoring result within the second preset time period further comprises:
when the monitoring result indicates that the response message is detected within the second preset time period and the response message indicates reducing the radio link configuration, detecting the device temperature of the UE within a third preset time period, wherein a start time of the third preset time period is a time when the response message is received; and
when the device temperature of the UE within the third preset time period indicates that the UE is still overheated, sending a second request message for adjusting the radio link configuration at an end time of the third preset time period.

* * * * *